United States Patent
Wagner et al.

(10) Patent No.: US 12,349,683 B2
(45) Date of Patent: Jul. 8, 2025

(54) METHOD FOR SEVERING DOUGH PORTIONS FROM A DOUGH MASS

(71) Applicant: FRITSCH BAKERY TECHNOLOGIES GMBH & CO. KG, Markt Einersheim (DE)

(72) Inventors: Alex Wagner, Wuerzburg (DE); Thomas Ebert, Dettelbach (DE)

(73) Assignee: Fritsch Bakery Technologies GmbH & Co. KG, Markt Einersheim (DE)

(*) Notice: Subject to any disclaimer, the term of this patent is extended or adjusted under 35 U.S.C. 154(b) by 254 days.

(21) Appl. No.: 18/204,221

(22) Filed: May 31, 2023

(65) Prior Publication Data
US 2023/0389556 A1    Dec. 7, 2023

(30) Foreign Application Priority Data
Jun. 2, 2022    (DE) .......................... 102022113972.7

(51) Int. Cl.
*A21C 5/00*    (2006.01)
*A21D 8/02*    (2006.01)

(52) U.S. Cl.
CPC ................ *A21C 5/003* (2013.01); *A21D 8/02* (2013.01)

(58) Field of Classification Search
CPC .................................... A21C 5/03; A21D 8/02
See application file for complete search history.

(56) References Cited

U.S. PATENT DOCUMENTS

| | | | |
|---|---|---|---|
| 3,785,623 A | 1/1974 | Koenig | |
| 5,733,583 A * | 3/1998 | Muller | A21C 3/04 426/503 |
| 5,811,145 A | 9/1998 | Morikawa | |
| 5,888,573 A * | 3/1999 | Hayashi | A21C 3/04 426/517 |
| 6,171,629 B1 * | 1/2001 | Morikawa | A21C 3/04 100/163 R |

(Continued)

FOREIGN PATENT DOCUMENTS

| | | |
|---|---|---|
| AT | 377 420 B | 3/1985 |
| CN | 114532378 A | 5/2022 |

(Continued)

OTHER PUBLICATIONS

Japanese Notice of Allowance, JP Application No. P2023-082397, dated Sep. 24, 2024 (with English machine translation) (6 pages).

(Continued)

*Primary Examiner* — Omar Flores Sanchez
(74) *Attorney, Agent, or Firm* — Brooks Kushman P.C.

(57) ABSTRACT

A method for severing a dough portion from a dough mass by a dough portioning device having a container, a first portioning roller having a plurality of severing edges and a second portioning roller having a plurality of severing edges, wherein a depression is respectively provided between two severing edges. The method comprises rotating the first and second portioning rollers into a receiving position, and receiving a part of the dough mass in two depressions of the first and second portioning rollers facing the container. The method further comprises rotating the first and second portioning rollers into a waiting position, decreasing rotational speeds of the first and second portioning rollers, waiting for a waiting time to elapse and increasing the rotational speeds of the first and second portioning rollers and rotating the first and second portioning rollers into a severing position.

14 Claims, 9 Drawing Sheets

(56) References Cited

U.S. PATENT DOCUMENTS

| | | | | |
|---|---|---|---|---|
| 6,322,345 | B1* | 11/2001 | Zaltron | A21C 3/04 |
| | | | | 425/363 |
| 8,672,664 | B2* | 3/2014 | Uchida | A23G 3/0278 |
| | | | | 425/315 |
| 10,383,341 | B2* | 8/2019 | Morikawa | A21C 3/04 |
| 2002/0071893 | A1* | 6/2002 | Taylor | A21D 13/32 |
| | | | | 426/446 |
| 2014/0342072 | A1* | 11/2014 | Van Gerwen | A22C 7/0076 |
| | | | | 425/239 |
| 2017/0172157 | A1* | 6/2017 | Drocco | A21C 5/08 |

FOREIGN PATENT DOCUMENTS

| | | |
|---|---|---|
| DE | 34 44 085 A1 | 6/1986 |
| DE | 36 12 615 A1 | 11/1987 |
| EP | 0 128 135 A2 | 12/1984 |
| EP | 3 603 401 A1 | 2/2020 |
| JP | S60105482 A | 6/1985 |
| JP | 2007166942 A | 7/2007 |

OTHER PUBLICATIONS

Japanese Office Action, JP Application No. P2023-082397, dated May 21, 2024 (with English machine translation) (5 pages).

German Search Report Dated Feb. 13, 2023, Application No. 10 2022 113 972.7, Applicant Fritsch Bakery Technologies GmbH & Co. KG, 5 Pages.

European Search Report (with English Machine Translation) Dated Oct. 16, 2023, Application No. 23174434.3-1002, Applicant Fritsch Bakery Technologies GmbH & Co. KG, 17 Pages.

\* cited by examiner

METHOD FOR SEVERING DOUGH PORTIONS FROM A DOUGH MASS

CROSS REFERENCE TO RELATED APPLICATIONS

This application claims foreign priority benefits under 35 U.S.C. § 119(a)-(d) to German patent application number DE 102022113972.7, filed Jun. 2, 2022, which is incorporated by reference in its entirety.

TECHNICAL FIELD

The disclosure relates to a method for severing dough portions from a dough mass.

BACKGROUND

Such a method is known for example from EP 3 603 401 A1. Therein, a device and a method for portioning a dough mass are disclosed. The disclosed device comprises a receiving chamber for receiving the dough mass and a pair of rotating cutters, which are disposed at a discharge opening of receiving chamber. Each of the cutters comprises three blades, which are rotatable around a rotating axis. One blade of each cutter respectively cooperate with each other, such that a dough portion can be severed from the dough mass by rotating the cutters. The disclosed device further comprises a separating agent supply system for applying a separating agent onto the blades. The separating agent supply system comprises several nozzles, which are configured to spray the separating agent. Even though separating agents are applied, conventional methods for severing dough portions leave room for improvements.

SUMMARY

It is an object of the disclosure to provide an improved method for severing dough portions from a dough mass.

The present disclosure relates to a method for severing a dough portion from a dough mass by a dough portioning device having a container as well as a first portioning roller having a plurality of severing edges and a second portioning roller having a plurality of severing edges. A depression is respectively provided between two severing edges. The method comprises rotating the first and the second portioning roller into a receiving position, in which a first severing edge of the first portioning roller and a second severing edge of the second portioning roller are separated by a receiving distance, receiving a part of the dough mass in two depressions of the first and second portioning rollers facing the container and rotating the first and the second portioning roller into a waiting position, in which the first severing edge of the first portioning roller and the second severing edge of the second portioning roller are separated by a waiting distance. The method further comprises decreasing the rotational speeds of the first and second portioning rollers and waiting for a waiting time to elapse, wherein during the waiting time the rotation speed may remain decreased, in particular decreased to 0. The method further comprises increasing the rotational speeds of the first and second portioning rollers and rotating the first and second portioning rollers into a severing position, in which the first severing edge of the first severing roller and the second severing edge of the second portioning roller are separated by a severing distance. The receiving distance is larger than the waiting distance and the waiting distance is larger than the severing distance.

By rotating into the waiting position, the dough portioning device may at first be partly opened without completely severing the dough portion from the dough mass. During the waiting time, the dough portion may start separating from the portioning rollers. In particular, the waiting time may serve to await an at least partial separation of the dough mass. By rotating further into the severing position, a dough portion may be completely severed. By this method, a separation of the dough portion from portions of the portioning rollers prior to the dough portion falling out of the dough portioning device may be enabled. This may enable a more orderly falling. Further, the risk of the dough portion tearing by sticking to portions of the portioning rollers moving outwardly may be reduced.

It may be advantageous if the waiting time is adjustable. This may enable the waiting time to be adaptable, for example to different dough properties, which may cause the dough mass to separate at different speeds from the portioning rollers. The waiting time may for example be at most 10 seconds, preferably at most 5 seconds, particularly preferred at most 2 seconds.

It is conceivable that the first portioning roller is rotated by a first angle between the receiving position and the waiting position and the second portioning roller is rotated by a second angle between the receiving position and the waiting position. It may be particularly beneficial, if the first and the second angle are equal. This may facilitate control of rotation. The first angle may be for example between 60° and 80°, preferably 70°.

It may be advantageous, if the decreasing of the rotational speeds of the first and second portioning rollers comprises a decrease by 50%, preferably a decrease by 80%, particularly preferred a decrease by more than 90%. It may be particularly beneficial, if the decreasing of the rotation speeds of the first and second portioning rollers comprises a decrease by 100%, in particular a stopping of the first and/or second portioning roller. Separation of the dough mass may be facilitated by a particularly large decrease.

Further, a portioning roller for a dough portioning device is disclosed. The portioning roller may be configurable for portioning of dough and supportable rotatably around a rotation axis. The portioning roller may have a plurality of severing edges and a depression may be respectively provided between two severing edges. A surface of the depression may comprise a first partial area and a second partial area, which have a different shape and/or different surface properties. The partial areas may be optimized with respect to their different functions by the different surface properties and/or the different shapes.

The surface of the depression may also have more than two partial areas. Each of the partial areas may have surface properties which differ from the surface properties of one or more of the other partial areas. It is conceivable that the surface properties differ with respect to the following properties: roughness, grooves, coating materials and/or properties, adhesion tendency (in particular anti-stick properties), oleophilicity or oleophobicity, lipophilicity or lipophobicity, hydrophilicity or hydrophobicity.

The first and the second partial areas may be separated by a separation line, which is preferably imaginary. The separation line may for example be oriented in parallel to the rotation axis. This may be advantageous because the surface properties may be adapted to requirements in different rotational positions or movements, respectively. It is further conceivable that the separation line does not run in a straight line but for example in a waveform.

It is conceivable that the first partial area is disposed, with respect to an abutting severing edge, on a side of the severing edge abutting the depression, which points in a rotational direction. Since the side of the abutting severing edge pointing in the rotational direction always engages the dough mass in the same way, the surface properties of the first partial area may be optimized with respect to set engagement. Alternatively or additionally, the second partial area may be disposed, with respect to the abutting severing edge, on a side of the abutting severing edge pointing against the rotational direction. Since the side of the abutting severing edge pointing against the rotational direction always engages the dough mass in the same way, this may enable the surface properties to of the second partial area to be optimized with respect to set engagement.

The disclosure also relates to a dough portioning device comprising a container and at least one, preferably two, portioning rollers of this type described above.

Further, a portioning roller assembly is disclosed, which may be configured to generate dough portions from a dough mass. The portioning roller assembly may comprise the portioning roller as a first portioning roller, which may be supported rotatably around the first rotation axis. The portioning roller assembly may comprise a further portioning roller as a second portioning roller, which may be supported rotatably around the second rotation axis. The first and/or the second portioning roller may each comprise a plurality of depressions, which may each be disposed between two severing edges. The portioning roller assembly may further comprise a stripper assembly, which may comprise a stripper and a stripper drive. The stripper drive may be configured to move the stripper along the first portioning roller and/or the second portioning roller.

By moving the stripper along the portioning rollers, dough remaining on the rollers unintentionally may be removed. In particular, the stripper may be movable along the portioning rollers in a stripping direction, which may be oriented in parallel to the rotation axis of the portioning rollers to be stripped. A further advantage may be a removal of superfluous separating agent, which for example may not have been discharged with the dough portion generated. In this way, and accumulation of separating agent in the portioning roller assembly may be prevented.

It is conceivable that the stripper device comprises one or a plurality of strippers. For example, a stripper may be configured to be moved along the first and the second portioning roller, in particular in order to remove remaining dough from both portioning rollers. In this case, it may be advantageous if the stripper is drivable by one stripper drive. It is further conceivable that a stripper is configured to be moved along the first portioning roller only, in particular in order to remove remaining dough from the first portioning roller, or is configured to move along the second portioning roller only, in particular in order to remove remaining dough from the second portioning roller. Here, it may be advantageous, if the stripper device comprises a first stripper, which is configured to be moved along the first portioning roller only, and a second stripper, which is configured to be moved along the second portioning roller only. The first stripper and the second stripper may be drivable by a common stripper drive. It is also conceivable that the drive device comprises a first stripper drive, which may be configured to drive the first stripper, i.e., may be configured to move the first stripper along the first portioning roller. The drive device may further comprise a second stripper drive, which may be configured to drive the second stripper, i.e., may be configured to move the second stripper along the second portioning roller.

It is conceivable that the stripper is configured to engage in one of the plurality of depressions. This may enable a thorough removal of remaining dough.

It may be advantageous, if a shifting range of the stripper drive, in which the stripper is movable, is longer than the first and/or the second portioning roller in a direction oriented parallel to the rotation axis. In this way, a shifting of the stripper beyond at least one front face of one or both portioning rollers may be enabled, whereby on one hand remaining dough may be moved beyond said front face as well and in this way may be removed from the portioning roller. On the other hand, such a shifting range may enable the stripper to be disposed in a parking position, which may enable a rotation of the portioning roller or the portioning rollers, respectively, without the stripper interfering. A surface of the portioning roller, which is oriented substantially orthogonal with respect to the rotation axis of that portioning roller may be considered a front face of said portioning roller. It may be particularly beneficial, if the stripper is movable beyond both front faces of the first and/or the second portioning roller. In this way, removal of remaining dough in two shifting directions and provision of parking positions on both sides of the portioning roller may be enabled. In this way, an acceleration of the stripping process may be enabled by eliminating the need for shifting back the stripper after or prior to the stripping.

It is conceivable that the portioning roller assembly is configured to apply a separating agent onto a surface of one of the plurality of depressions after the stripper has been moved along this depression. Since the stripper may also remove remaining separating agent from the portioning roller, in particular from the surface of the depression, a renewed generation of a separating agent film may be enabled. In particular, a reproducible film of separating agent may be achieved by regularly removing separating agent from the portioning roller, in particular from the surface of the depression, and reapplying onto the portioning roller, in particular onto the surface of the depression.

The portioning roller assembly may further comprise a separating agent applicator, which may be configured to apply a separating agent onto a surface of a depression of the plurality of depressions of the first portioning roller. The separating agent applicator may comprise a nozzle, which may be configured to generate a spraying cone. When the first portioning roller is disposed in a spraying position the nozzle may be spaced from a first severing edge delimiting the depression by a first distance measured in a spraying direction which may be oriented in parallel to a spraying cone axis of the spraying cone, which is larger than a second distance measured in the spraying direction of the nozzle from a second severing edge delimiting the depression. Further, when the first portioning roller is disposed in a spraying position, the nozzle may be spaced from the first severing edge delimiting the depression by a first transverse distance measured in a transverse direction, which may be oriented orthogonally with respect to the spraying direction, which may be larger than a second transverse distance measured in the transverse direction of the nozzle from the second severing edge delimiting the depression.

This configuration may allow for a particularly close positioning of the nozzle to the portioning roller. The spraying cone grows larger with increasing distance in the spraying direction. By providing a larger transverse distance from the severing edge, which is disposed father away from the nozzle in the spraying direction, spraying separating agent over the father away severing edge caused by the enlargement of the spraying cone may be prevented.

The ratio between the second distance measured in the spraying direction and the first distance measured in the spraying direction may for example be greater than 1.5, preferably greater than 2.5, particularly preferred greater than 3. The ration between the second transverse distance measured in the transverse direction and the first transverse distance measured in the transverse direction may for example be greater than 1.25, preferably greater than 2, particularly preferred greater than 2.3.

It is conceivable that the nozzle is movable along the portioning roller, in particular in parallel to the first rotation axis. The portioning roller assembly, in particular the separating agent applicator, may comprise a nozzle drive, which may be configured to move the nozzle along the first portioning roller, in particular parallel to the first rotation axis. It is further conceivable that the stripper drive is configured to move the nozzle along the first portioning roller, in particular parallel to the first rotation axis. Said stripper drive may be the first stripper drive mentioned further above, which may be configured to drive the first stripper, e.g., may be configured to move the first stripper along the first portioning roller. It is further conceivable that said stripper drive is a stripper drive explained further above as well, which is configured to move the first stripper and the second stripper jointly.

With respect to the separating agent applicator only the possible application of a separating agent onto one surface of one depression of the plurality of depressions of the first portioning roller has been described explicitly so far. However, a skilled person recognizes that the separating agent applicator may be configured to apply a separating agent onto a surface of a depression of the plurality of depressions of the second portioning roller. The separating agent applicator may for example comprise a second nozzle. All of the above and following explanations with respect to the nozzle and the first portioning roller, respectively, may be applicable analogously to the second nozzle and the second portioning roller, respectively.

The nozzle and the second nozzle may be movable jointly along the first portioning roller, in particular in parallel to the first rotation axis. The nozzle drive may be configured to move the nozzle along the first portioning roller, in particular parallel to the first rotation axis, and move the second nozzle along the second portioning roller, in particular in parallel to the second rotation axis. However, the nozzle and the second nozzle may as well be separately movable. It is further conceivable that the portioning roller assembly, in particular the separating agent applicator, comprises a second nozzle drive, which may be configured to move the second nozzle along the second portioning roller, in particular in parallel to the second rotation axis. Similar to the nozzle, the second nozzle may be movable by the second stripper drive mentioned further above, which may be configured to drive the second stripper, i.e., may be configured to move the second stripper along the second portioning roller. It is further conceivable that the second nozzle is movable by a stripper drive, which is configured to drive the first stripper and the second stripper jointly.

The disclosure also relates to a dough portioning device comprising a container and a portioning roller assembly of the type described above.

The disclosure also relates to a method for applying a separating agent onto a portioning roller by a separating agent applicator, which comprises a nozzle, which is configured to generate a spraying cone, wherein the portioning roller is supported rotatably around a first rotation axis. The method comprises pivoting the nozzle around a pivoting axis by a pivoting drive and shifting the nozzle along the portioning roller by a nozzle drive after the pivoting of the nozzle. Such a moving of the nozzle may enable a nozzle to be positioned more closely to the portioning roller, to which the separating agent is to be applied, whereby the portion of the separating agent exiting the nozzle which does not reach the portioning roller, may be reduced. By the close the positioning, the opening of the spraying cone generated by the nozzle may be limited. At the same time, the shifting and pivoting motion may enable the entire surface of the portioning roller to be wetted.

It is conceivable that the pivoting axis and the rotation axis are oriented substantially in parallel with respect to each other.

The method may further comprise shifting the nozzle prior to pivoting the nozzle. In particular, a shifting of the nozzle prior to the pivoting of the nozzle and the shifting of the nozzle after the pivoting of the nozzle may occur in the same or opposite shifting directions. It may be particularly beneficial, if the nozzle is shifted along an entire axial length of the portioning roller during the shifting prior and/or after the pivoting. This may be advantageous in particular when the shifting of the nozzle prior to the pivoting of the nozzle and the shifting of the nozzle after the pivoting of the nozzle occur in opposite shifting directions.

BRIEF DESCRIPTION OF THE DRAWINGS

The disclosure relates to devices and methods of the type described above. In the following, some representative embodiments are further explained using drawings as examples.

DETAILED DESCRIPTION

Figure 1:
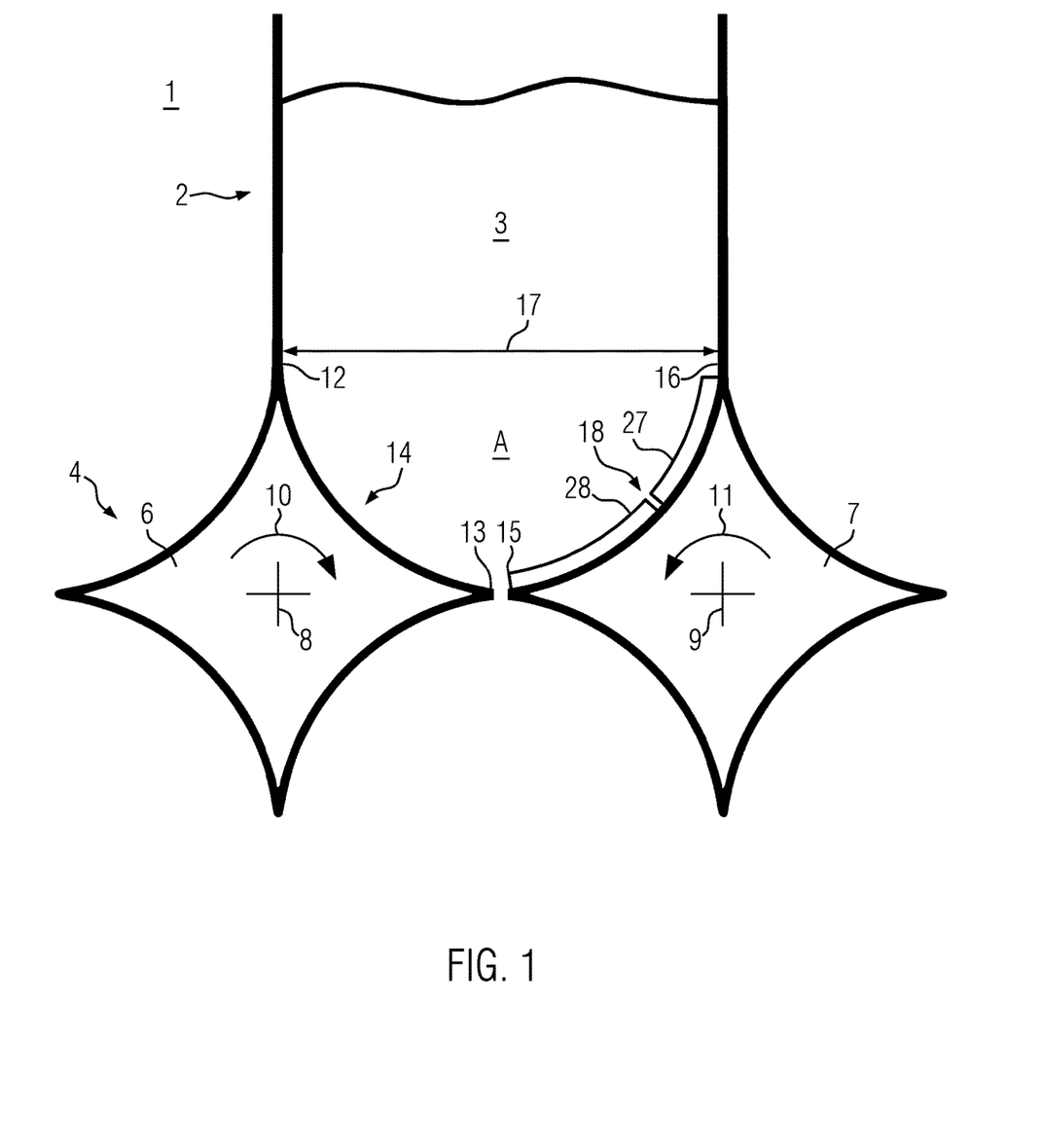
FIG. 1 shows a schematic sectional view of a dough portioning device having portioning rollers according to a first embodiment.

In FIG. 1, a dough portioning device 1 is shown in a schematic sectional view. The dough portioning device 1 may comprise a container 2. The container 2 may be configured to receive a dough mass 3. The dough portioning device 1 may further comprise a portioning roller assembly 4. The portioning roller assembly 4 may be configured to generate dough portions 5 (see FIG. 3) out of the dough mass 3. The dough portioning device 1, in particular the portioning roller assembly 4, may comprise a first portioning roller 6. The dough portioning device 1, in particular the portioning roller assembly 4, may further comprise a second portioning roller 7. The first portioning roller 6 may be supported or supportable rotatably around a first rotation axis 8. The second portioning roller 7 may be supported or supportable rotatably around a second rotation axis 9. The first portioning roller 6 may be rotatable in a first rotational direction 10 around the first rotation axis 8. The second portioning roller 7 may be rotatable in a second rotational direction 11 around the second rotation axis 9. The first rotational direction 10 and the second rotational direction 11 may be oriented opposite.

Each of the portioning rollers 6, 7 may have several severing edges. A depression may be disposed respectively between 2 severing edges. The first portioning roller 6 may have a first severing edge 12. Further, the first portioning roller 6 may have a second severing edge 13. Between the first severing edge 12 of the first portioning roller 6 and the second severing edge 13 of the first portioning roller 6, a depression 14 may be disposed. Further, the second portioning roller 7 may have a first severing edge 15. Further, the second portioning roller 7 may have a second severing edge 16. A further depression 18 may be provided between the first severing edge 15 of the second portioning roller 7 and the second severing edge 16 of the second portioning roller 7.

In FIG. 1, the first portioning roller 6 and the second portioning roller 7 are shown in a receiving position A. In the receiving position A, the first severing edge 12 of the first portioning roller 6 and the second severing edge 16 of the second portioning roller 7 may be separated by a receiving distance 17. The receiving position A may enable receiving part of the dough mass 3 in the depressions 14, 18. The gap between the second severing edge 13 of the first portioning roller 6 and the first severing edge 15 of the second portioning roller 7 may be very small in reality. In FIG. 1, it is shown enlarged in order to improve visibility.

Figure 2:
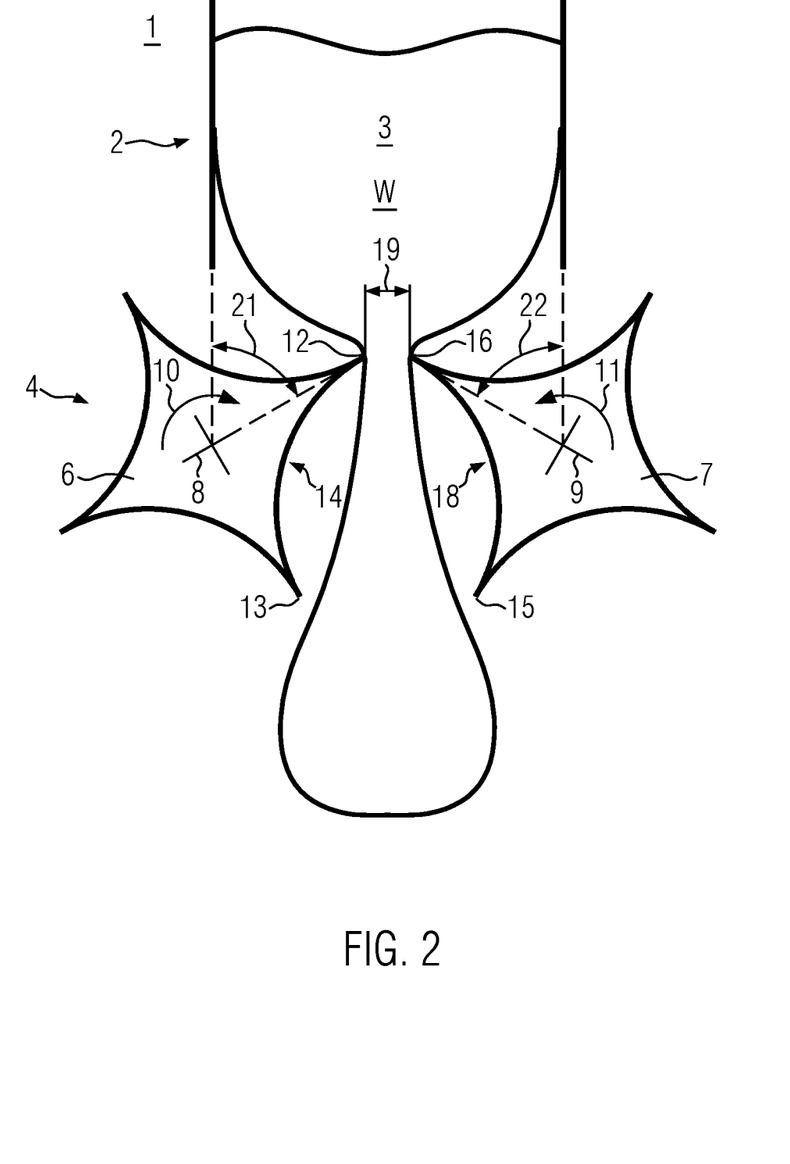
FIG. 2 shows the view from FIG. 1, wherein the portioning rollers are shown in a different rotational position.
Figure 3:
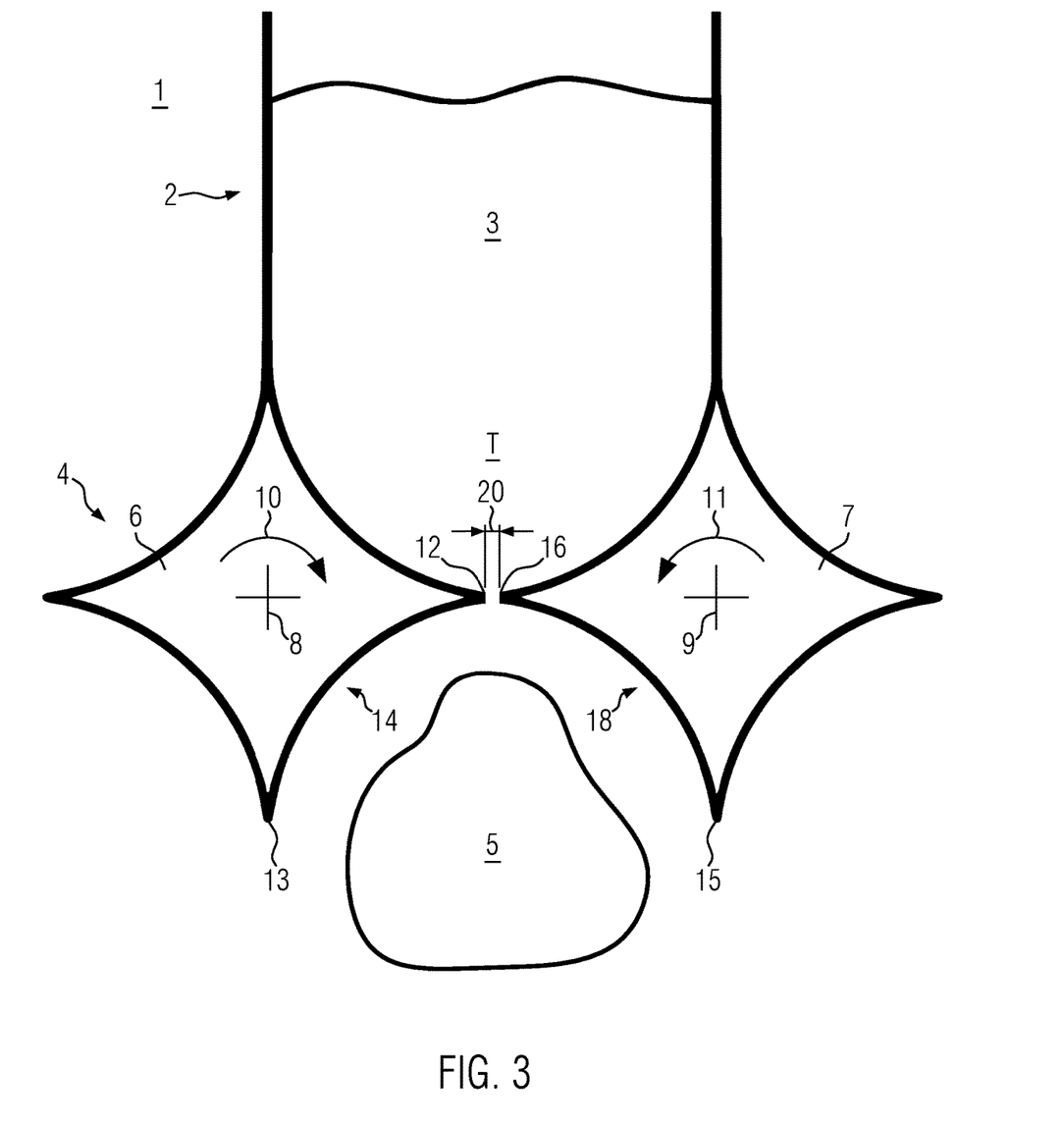
FIG. 3 shows the view from FIGS. 1 and 2, respectively, wherein the portioning rollers are shown in a different rotational position.

In FIG. 2, the dough portioning device 1 is shown in the same perspective. However, the first portioning roller 6 and the second portioning roller 7 are shown in an orientation, which is rotated with respect to FIG. 1. The configuration of the first and the second portioning roller 6, 7, which is shown in FIG. 2, will be referred to as the waiting position W in the following. In the waiting position W, the first severing edge 12 of the first portioning roller 6 and the second severing edge 16 of the second portioning roller 7 may be separated by a waiting distance 19. After the first portioning roller 6 and the second portioning roller 7 have been rotated from the receiving position P into the waiting position W, the rotational speeds of the portioning rollers, 7 may be decreased. Subsequently, the lapsing of a waiting time may be awaited, wherein during the waiting time, the rotational speeds of the first and the second portioning rollers 6, 7 may remain decreased. In this way, a separation of the dough mass 3 from the depressions 14, 18 may be awaited. After the waiting time has elapsed, the rotational speeds of the first portioning roller 6 and the second portioning roller 7 may be increased again. After that, the portioning rollers 6, 7 may be rotated into a severing position T, which is shown in FIG. 3.

In the severing position T, the first severing edge 12 of the first portioning roller 6 and the second severing edge 16 of the second portioning roller 7 may be separated by a severing distance 20. The severing distance 20 may be very small. In FIG. 3, it is shown enlarged in order to improve visibility. As may be recognized from FIGS. 1 to 3 of the embodiment, the receiving distance 17 may be larger than the waiting distance 19. The waiting distance 19 may be larger than the severing distance 20. As can also be seen in FIG. 3, the severing distance 20 may be so small that the dough portion 15 is severed completely from the dough mass 3. By awaiting the separation of the dough out of the depressions 14, 18, a higher reproducibility of the following of the dough portion 5 may be achievable.

The waiting time may be adjustable, for example to account for different dough consistencies. The waiting time may be for example at most 10 seconds, preferably at most 5 seconds, particularly preferred 2 seconds. The first portioning roller 6 may be rotated by an angle 21 between the receiving position A and the waiting position W. The second portioning roller 7 may be rotated by an angle 22 between the receiving position A and the waiting position W. As shown in the present embodiment, the first angle 21 and the second angle 22 may be equal. The first angle may be between 60° and 80°, preferably 70°. The decreasing of the rotational speeds of the first portioning roller 6 and the second portioning roller 7 may for example comprise a decrease by more than 50%, preferably a decrease by more than 80%, particularly preferred a decrease by more than 90%. A decrease of rotational speeds of the first portioning roller 6 and the second portioning roller 7 by 100% may be particularly beneficial. In particular, the portioning rollers 6, 7 may be stopped.

Figure 4:
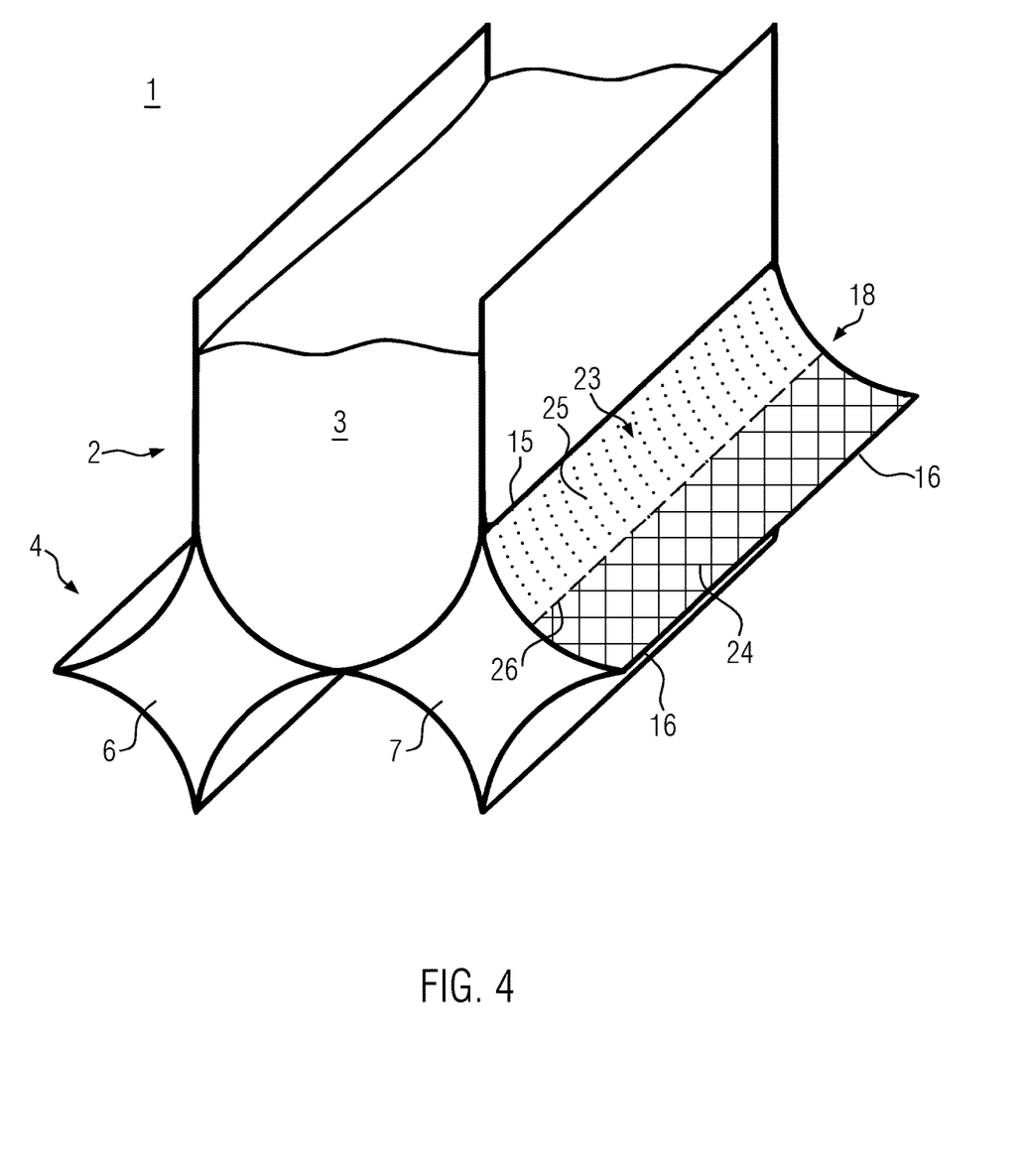
FIG. 4 shows the dough portioning device from FIGS. 1-3 in a schematic perspective view.

In the following, the depressions 14, 18 will be explained in more detail. The following explanations are to be considered representative of all depressions. In FIG. 4, a perspective view of the dough portioning device 1 is shown. The portioning rollers 6, 7 are shown in a further rotated position, such that the depression 18 is better visible. The depression 18 may have a surface 23. The surface 23 may have a first partial area 24. The surface 23 may further have a second partial area 25. As indicated by different patterns in the present embodiment, the first partial area 24 and the second partial area 25 may have different surface properties. The first partial area 24 and the second partial area 25 may be separated by an imaginary separating line 26, which is shown as a broken line in FIG. 4. As can be seen in the embodiment, the separating line 26 may be oriented in parallel to the second rotation axis 9.

It can be recognized that when the portioning rollers 6, 7 are oriented in the receiving position A, the main portion of the weight of the dough mass 3 is always supported by the partial areas on the side pointing against the respective rotational direction 10, 11, namely the second partial areas 25. Therefore, it may be advantageous, to provide surface properties on those partial areas, which are different from the first partial areas.

Figure 5:
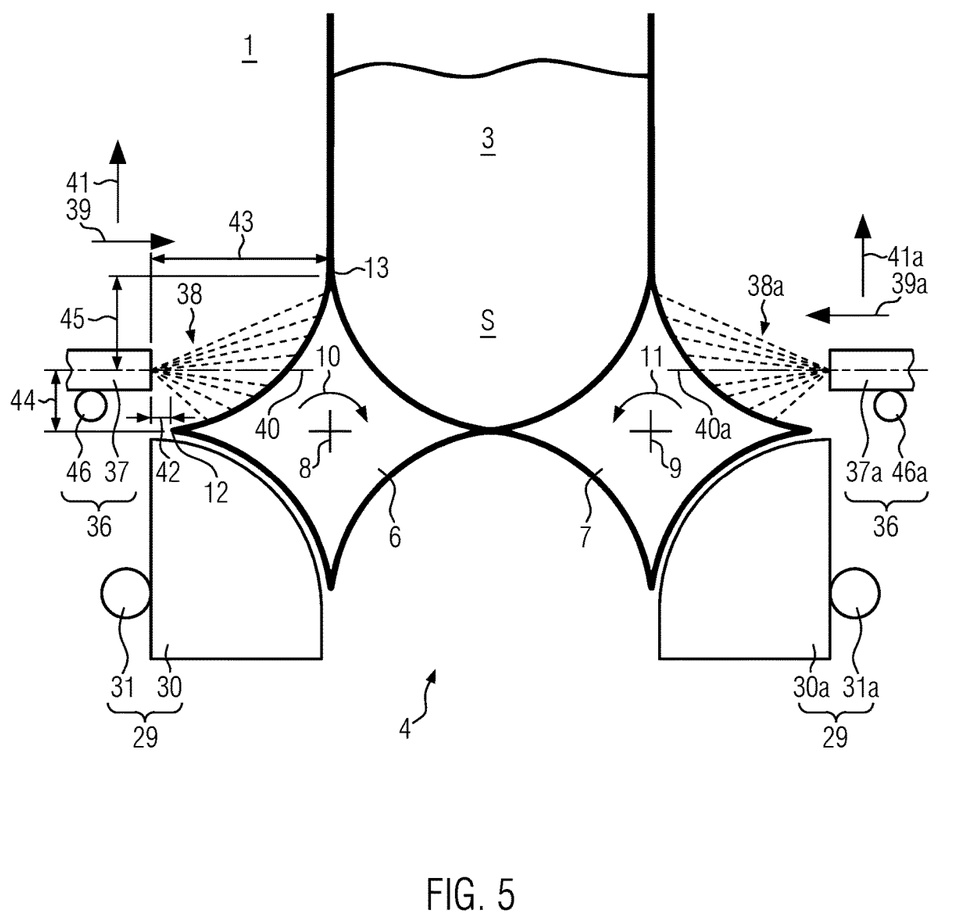
FIG. 5 shows a schematic sectional view of a dough portioning device having portioning rollers according to a further embodiment.

FIG. 5 shows a schematic sectional view of a further embodiment. Identical reference signs indicate identical structures. In addition to the embodiment described further above, the portioning roller assembly 4 as shown in FIG. 5 may comprise a stripper device 29. The stripper device 29 may comprise a stripper 30. The stripper device 29 may further comprise a stripper drive 31. The stripper drive 31 may be configured to move the stripper 30 along the first portioning roller 6. As shown in the present embodiment, the stripper device 29 may comprise a second stripper 30a. The stripper device 29 may further comprise a second stripper drive 31a. The second stripper drive 31a may be configured to move the second stripper 30a along the second portioning roller 7. The second stripper 30a and the second stripper drive 31a may be configured analogously to the stripper 30 and the stripper drive 31. In order to avoid repetitions, only the stripper 30 and the stripper drive 31 will be explained in detail. However, all explanations are applicable to the second stripper 30a and the second stripper drive 31a as well.

Figure 6:
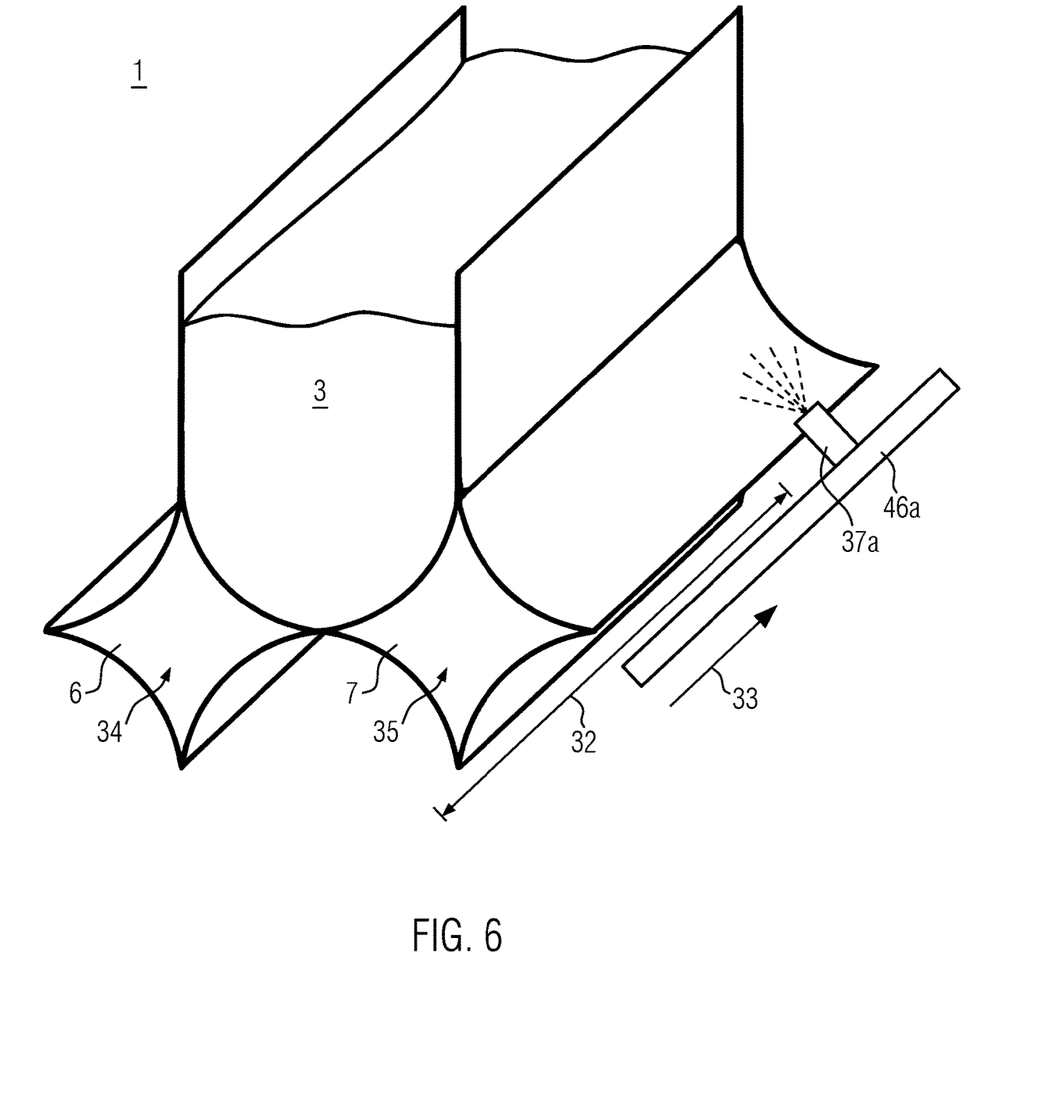
FIG. 6 shows the dough portioning device from FIG. 5 in a schematic perspective view.

The stripper 30 may be configured to engage into one of the depressions 14 of the first portioning roller 6. That is the shape of the stripper 30 may be adapted to the shape of the depressions 14. The stripper 30 may be shiftable in a shifting range 32 (see FIG. 6) of the stripper drive 31. As shown in the present embodiment, the shifting range 32 may be longer than the first and/or the second portioning roller 6, 7 in a shifting direction 33, which may be oriented in parallel to the first rotation axis and or the second rotation axis 9. In particular, the shifting range 32 may extend beyond front faces 34 and 35, respectively, of the first portioning roller 6 and the second portioning roller 7, respectively.

As shown in the embodiment, the portioning roller assembly for may comprise a separating agent applicator 36. The separating agent applicator 36 may comprise a nozzle 37. The separating agent applicator 36 may be configured to apply a separating agent onto one of the surfaces 23 of the depressions 14, 18. The nozzle 37 may be configured to generate a spraying cone 38. In particular, the nozzle 37 may be configured to spray a separating agent in a spraying direction 39. A direction, which is oriented in parallel to a spraying cone axis 40 may be considered a spraying direction 39. A direction oriented orthogonally to the spraying direction 39 will be referred to as transverse direction 41 and the following.

In FIG. 5, the portioning roller assembly 4 is shown in a spraying position S. The spraying position S is the position, in which the portioning rollers 6, 7 may be sprayed with separating agent. When the portioning rollers 6, 7 are positioned in said spraying position S, the nozzle 37 may be spaced from the first severing edge 12 of the first portioning roller 6 by a first distance 42 measured in the spraying direction 39. The nozzle 37 may be spaced from the second severing edge 13 of the first portioning roller 6 by a second distance 43, which is also measured in the spraying direction 39. The first distance 42 may be smaller than the second distance 43. Measured in the transverse direction 41, the nozzle 37 may be spaced from the first severing edge 12 by a first transverse distance 44. The nozzle 37 may be spaced from the second severing edge 13 by a second transverse distance 45. The first transverse distance 44 may be smaller than the second transverse distance 45.

The separating agent applicator 36 may further comprise a second nozzle 37a. All explanations further above related to the nozzle 37 may be applicable to the second nozzle 37a as well.

The separating agent applicator 36 may comprise a nozzle drive 46. The nozzle drive 46 may be configured to move the nozzle 37 along the first portioning roller 6. Analogously, the separating agent applicator 36 may comprise a second nozzle drive 46a, which may be configured to move the second nozzle 37a along the second portioning roller 7. All nozzle drives and stripper drives may be threaded spindle drives or cylinder drives, in particular pneumatic cylinder drives, or combinations thereof.

Figure 7:
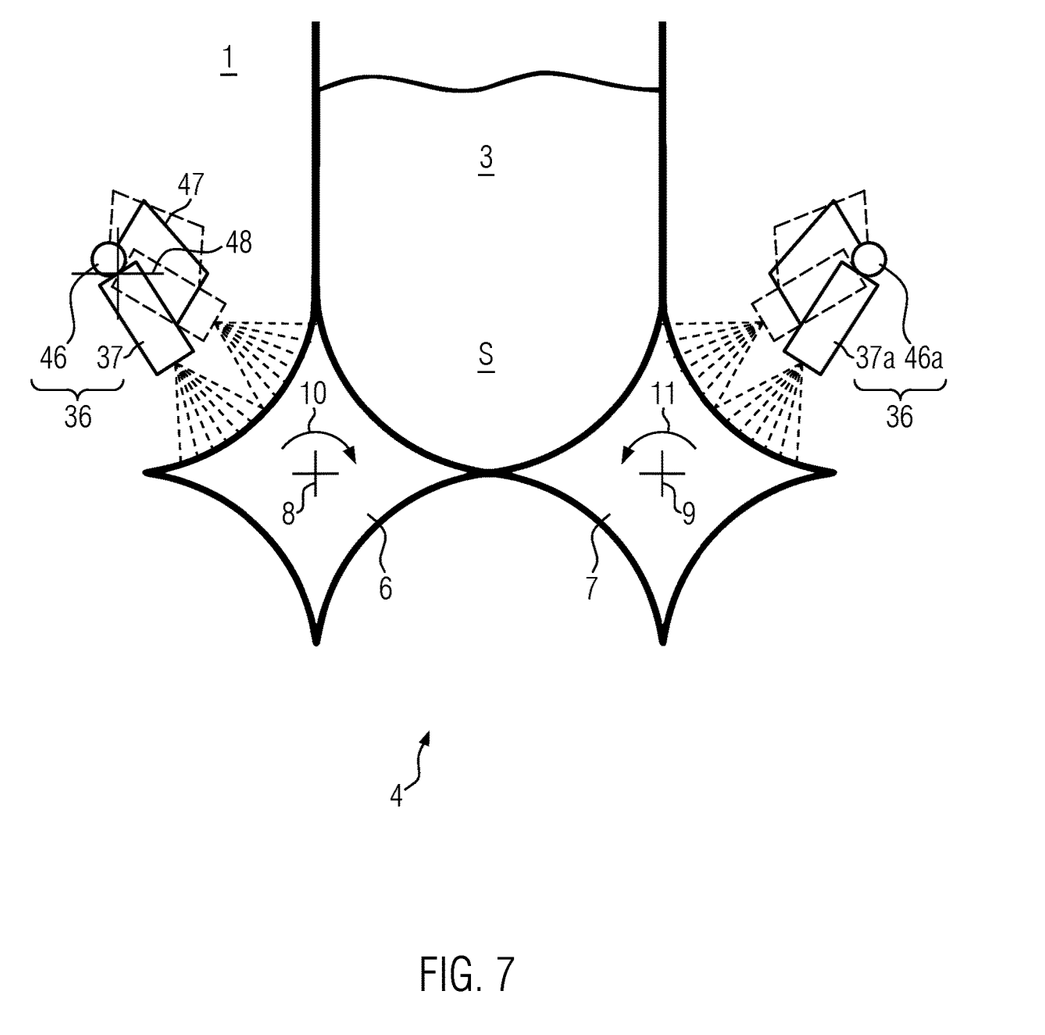
FIG. 7 shows a schematic sectional view of a dough portioning device having portioning rollers according to a further embodiment.
Figure 8:
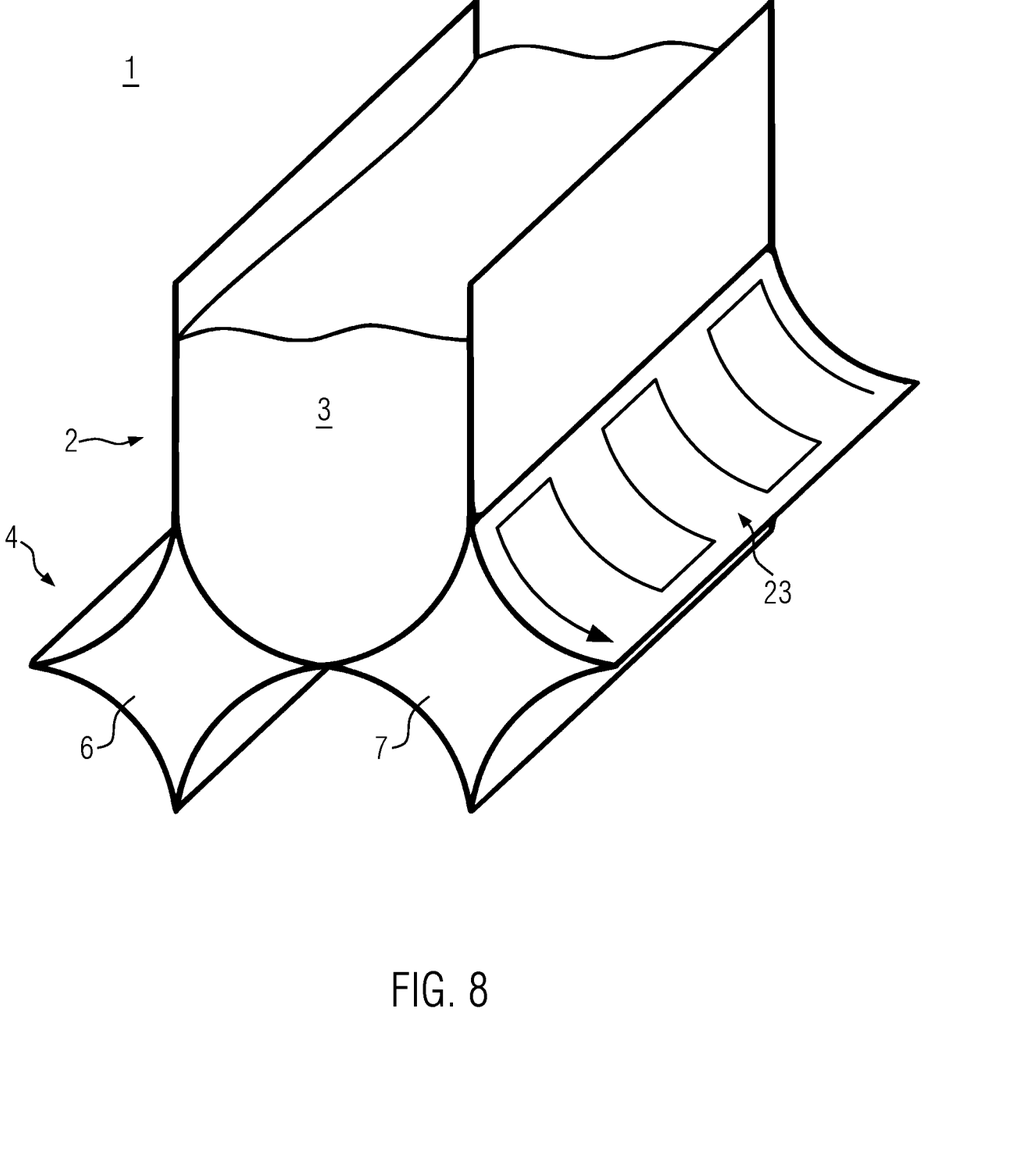
FIG. 8 shows a variant of the dough portioning device from FIG. 7 in a schematic perspective view.
Figure 9:
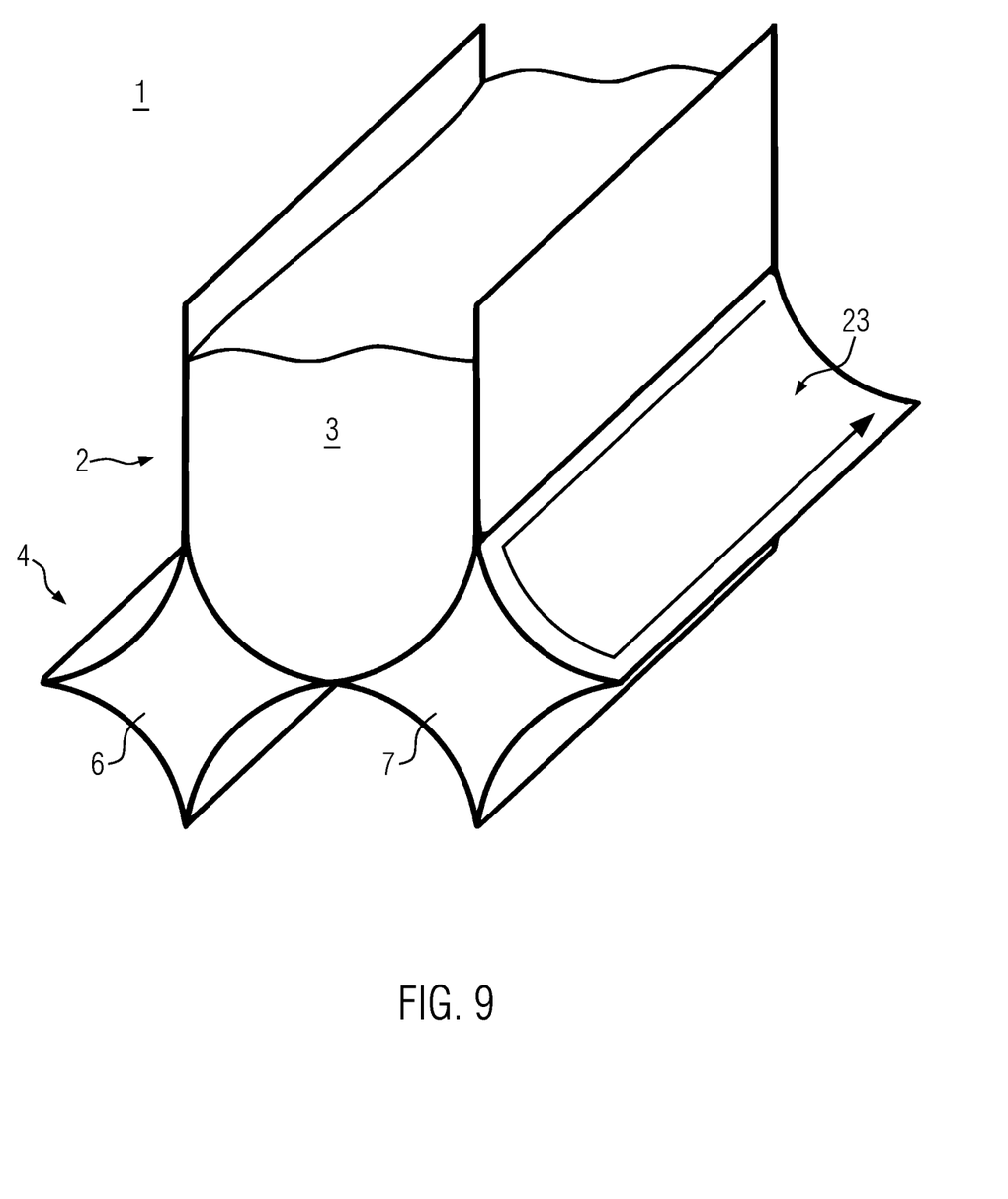
FIG. 9 shows a further variant of the dough portioning device from FIG. 7 in a schematic perspective view.

In FIGS. 7 to 9, a further embodiment of the dough portioning device 1 is shown. Identical reference signs indicate identical structures. In FIG. 7, a schematic sectional view of the dough portioning device 1 is shown. Similar to the embodiment explained further above with reference to FIGS. 5 and 6, the dough portioning device 1 according to the embodiment shown in FIG. 7 may comprise a separating agent applicator 36. Also similar to the embodiment explained with reference to FIG. 5, the separating agent applicator 36 may comprise a nozzle 37 and a nozzle drive 46.

As a difference to the previously explained embodiment, the nozzle 37 according to the present embodiment may be pivotable. For this purpose, the separating agent applicator 36 may comprise a pivoting drive 47. The pivoting of the nozzle 37 may occur around a pivoting axis 48, which may be oriented in parallel to the first rotation axis 8. As can be seen in FIG. 7, this embodiment may also provide a second nozzle 37a embodied analogously to the nozzle 37. The nozzle 37 may alternately be pivoted around the pivoting axis 48 and shifted along the first portioning roller 6 in order to apply separating agent to the entire surface 23 of the depression 14. Different moving sequences are conceivable, examples of which are shown in FIGS. 8 and 9 (for the sake of better visibility using the second portioning roller 7).

In FIG. 8, a moving scheme is indicated, in which the nozzles 37, 37a are shifted after pivoting and after another pivot are shifted in the same direction. In FIG. 9 a moving scheme is shown, in which the nozzles 37, 37a are shifted along the entire axial length of the respective portioning roller 6, 7 prior to and after pivoting. The shifting direction prior to the pivoting is oriented opposite the shifting direction after the pivoting.

The embodiments explained above and in particular the described combinations of features are to be considered as examples. A skilled person will recognize that features disclosed in the scope of different embodiments may be combined.

What is claimed is:

1. A method for severing a dough portion from a dough mass by a dough portioning device having a container as well as a first portioning roller having a plurality of severing edges and a second portioning roller having a plurality of severing edges, wherein a depression is respectively provided between two severing edges, and wherein the method comprises:
   rotating the first and second portioning rollers into a receiving position, in which a first severing edge of the first portioning roller and a second severing edge of the second portioning roller are separated by a receiving distance;
   receiving a part of the dough mass in two depressions of the first and second portioning rollers facing the container;
   rotating the first and second portioning rollers into a waiting position, in which the first severing edge of the first portioning roller and the second severing edge of the second portioning roller are separated by a waiting distance;
   decreasing rotational speeds of the first and second portioning rollers, waiting for a waiting time to elapse; and
   increasing the rotational speeds of the first and second portioning rollers and rotating the first and second portioning rollers into a severing position, in which the first severing edge of the first portioning roller and the second severing edge of the second portioning roller are separated by a severing distance;
   wherein the receiving distance is larger than the waiting distance and the waiting distance is larger than the severing distance.

2. The method according to claim 1, wherein the waiting time is adjustable.

3. The method according to claim 2, wherein the waiting time is at most 10 seconds.

4. The method according to claim 1, wherein the waiting time is at most 10 seconds.

5. The method according to claim 4, wherein the waiting time is at most 5 seconds.

6. The method according to claim 4, wherein the waiting time is at most 2 seconds.

7. The method according to claim 1, wherein the first portioning roller is rotated by a first angle between the receiving position and the waiting position and the second portioning roller is rotated by a second angle between the receiving position and the waiting position.

8. The method according to claim 7, wherein the first angle and the second angle are equal.

9. The method according to claim 7, wherein the first angle is 60° to 80°.

10. The method according to claim 9, wherein the first angle is 70°.

11. The method according to claim 1, wherein the decreasing of the rotational speeds of the first and second portioning rollers comprises a decrease by more than 50%.

12. The method according to claim 1, wherein the decreasing of the rotational speeds of the first and second portioning rollers comprises a decrease by more than 80%.

13. The method according to claim 1, wherein the decreasing of the rotational speeds of the first and second portioning rollers comprises a decrease by more than 90%.

14. The method according to claim 1, wherein the decreasing of the rotational speeds of the first and second portioning rollers comprises a decrease by 100%.

* * * * *